United States Patent
Gherardi et al.

(10) Patent No.: US 12,545,225 B2
(45) Date of Patent: Feb. 10, 2026

(54) BRAKE FLUID RESERVOIR

(71) Applicant: Brembo S.p.A., Bergamo (IT)

(72) Inventors: Pierangelo Gherardi, Bergamo (IT); Mattia Regazzoni, Bergamo (IT); Marco Caronia, Bergamo (IT); Daniele Penati, Bergamo (IT)

(73) Assignee: Brembo S.p.A., Bergamo (IT)

( * ) Notice: Subject to any disclaimer, the term of this patent is extended or adjusted under 35 U.S.C. 154(b) by 0 days.

(21) Appl. No.: 18/856,697

(22) PCT Filed: Apr. 14, 2023

(86) PCT No.: PCT/IB2023/053827
§ 371 (c)(1),
(2) Date: Oct. 14, 2024

(87) PCT Pub. No.: WO2023/199277
PCT Pub. Date: Oct. 19, 2023

(65) Prior Publication Data
US 2025/0249878 A1    Aug. 7, 2025

(30) Foreign Application Priority Data
Apr. 14, 2022 (IT) .......................... 102022000007433

(51) Int. Cl.
*B60T 11/26* (2006.01)
*B60T 17/06* (2006.01)
*B60T 17/22* (2006.01)

(52) U.S. Cl.
CPC ............... *B60T 11/26* (2013.01); *B60T 17/06* (2013.01); *B60T 17/222* (2013.01)

(58) Field of Classification Search
CPC ........ B60T 11/26; B60T 17/06; B60T 17/222; F15B 1/26
See application file for complete search history.

(56) References Cited

U.S. PATENT DOCUMENTS 4,503,678 A * 3/1985 Wimbush ................ F16D 25/12
   303/64
6,298,961 B1   10/2001 Hageman et al.
(Continued)

FOREIGN PATENT DOCUMENTS

DE       1909001 A1    9/1970
DE   102008006851 A1    8/2009
(Continued)

OTHER PUBLICATIONS

European Patent Office, Search Report in Application No. PCT/IB2023/053827, dated Jul. 5, 2023, 3 pages, Rijswijk, Netherlands.

*Primary Examiner* — Michael Leslie
(74) *Attorney, Agent, or Firm* — Marshall & Melhorn, LLC

(57) ABSTRACT

A brake fluid reservoir (1) comprising a receptacle (2), adapted to contain brake fluid, said receptacle (2) forming a bottom wall (3) and a perimetric wall (4), wherein the bottom wall (3) and the perimetric wall (4) define an inner compartment (5) for containing the brake fluid, wherein the perimetric wall (4) defines an inlet opening (6) opposite to the bottom wall (3) communicating with the inner compartment (5), and the bottom wall (3) defines an outlet opening (7) communicating with the inner compartment (5) and fluidically connectable to a braking system; a cap (8) configured to close the inlet opening (6); wherein the receptacle (2) defines an auxiliary opening (9), distinct from the inlet opening (6) and the outlet opening (7), communicating with the inner compartment (5); and wherein the reservoir (1) comprises a valve (10) positioned in the auxiliary opening (9), said valve (10) being configured to regulate a flow of brake fluid through the auxiliary opening (9).

8 Claims, 5 Drawing Sheets

(56) References Cited

U.S. PATENT DOCUMENTS

| | | | | |
|---|---|---|---|---|
| 6,434,935 | B1* | 8/2002 | Rammhofer | B60T 17/06 60/592 |
| 6,996,985 | B2* | 2/2006 | Bornkessel | B60T 17/06 60/592 |
| 9,995,317 | B2* | 6/2018 | Kobori | B60T 11/26 |
| 10,731,671 | B2* | 8/2020 | Neutsch | B62L 3/023 |

FOREIGN PATENT DOCUMENTS

| | | |
|---|---|---|
| DE | 102013005375 A1 | 7/2014 |
| FR | 2797665 A1 | 2/2001 |
| FR | 2844240 A1 | 3/2004 |
| FR | 3045579 A1 | 6/2017 |
| JP | H11278240 A | 10/1999 |
| WO | 2014122955 A1 | 8/2014 |

\* cited by examiner

BRAKE FLUID RESERVOIR

FIELD OF THE INVENTION

The present invention relates to a brake fluid reservoir, and in particular to a brake fluid reservoir for a racing motorcycle.

BACKGROUND ART

Racing motorcycles are provided with a brake fluid reservoir.

The brake fluid reservoir generally consists of a brake fluid receptacle, a diaphragm, and a membrane positioned inside the receptacle, and a screwable cap designed to allow opening and closing the receptacle.

The brake fluid reservoir mainly serves two functions.

The first function is to compensate for the wear of the friction materials in the braking system, such as brake pads and brake discs, by the brake fluid contained therein.

The second function is to allow topping up with brake fluid during the first loading of the braking system and during the steps of bleeding.

The brake fluid reservoir often needs to be opened for bleeding and topping up during the test sessions of a racing motorcycle.

These operations, carried out in the pits during hectic race weekends, often cause the introduction of impurities and dirt into the brake fluid, which can cause a variety of problems to the braking system, and in more severe cases lead to braking system failure.

Attempts have been made to address this critical issue by positioning a filter inside the brake fluid receptacle to prevent impurities from circulating in the braking system.

However, such a solution does not prevent impurities from entering in the brake fluid reservoir during the bleeding operations.

Moreover, such a known solution makes bleeding operations difficult, and in particular hinders the escape of air from the braking system. Furthermore, the progressive clogging of the filter makes it necessary to periodically inspect or replace the filter.

SOLUTION

It is the object of the present invention to provide a brake fluid reservoir, and in particular a brake fluid reservoir for a racing motorcycle, adapted to solve at least some of the drawbacks highlighted in the prior art.

It is a particular object of the present invention to provide a brake fluid reservoir such that the ingress of impurities is prevented or minimized during the operations of topping up and bleeding the reservoir itself.

It is a further particular object of the present invention to provide a brake fluid reservoir such that the operations of bleeding the reservoir itself are facilitated.

These and other objects are achieved by a brake fluid reservoir according to the independent claim.

The dependent claims relate to preferred and advantageous embodiments of the present invention.

DRAWINGS

In order to better understand the invention and appreciate the advantages thereof, some non-limiting exemplary embodiments thereof will be described below with reference to the accompanying drawings, in which.

DESCRIPTION OF SOME PREFERRED EMBODIMENTS

Figure 1:
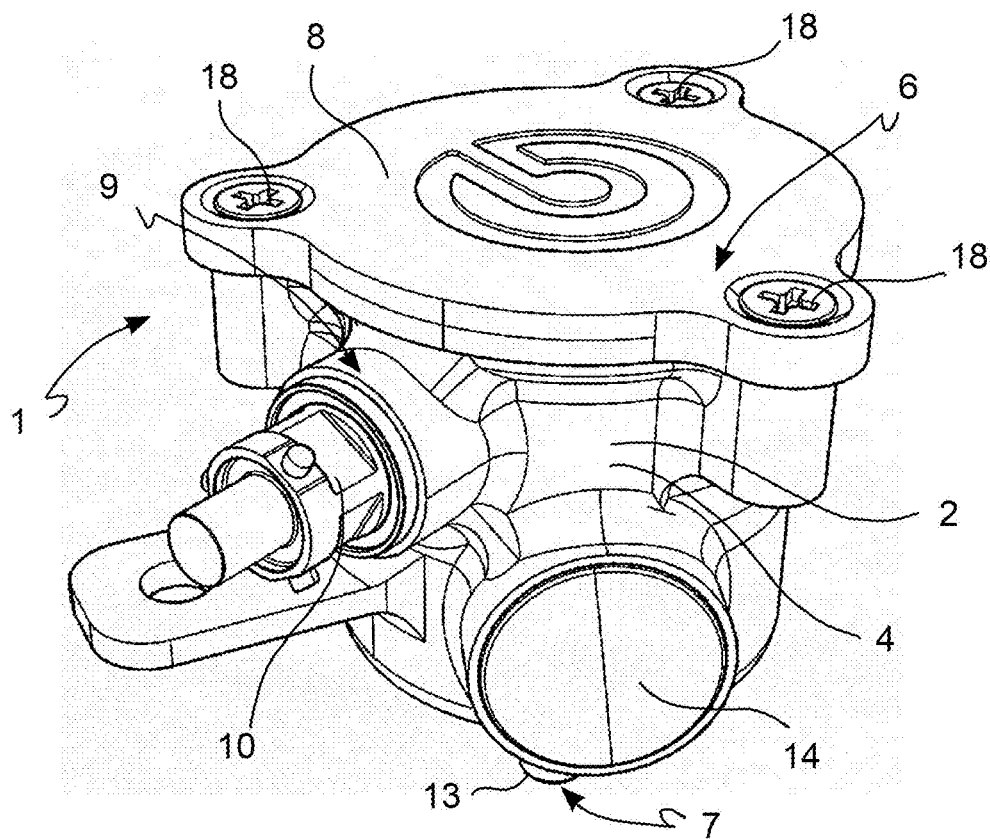
FIG. 1 is a perspective view of a brake fluid reservoir, according to an embodiment of the invention.
Figure 2:
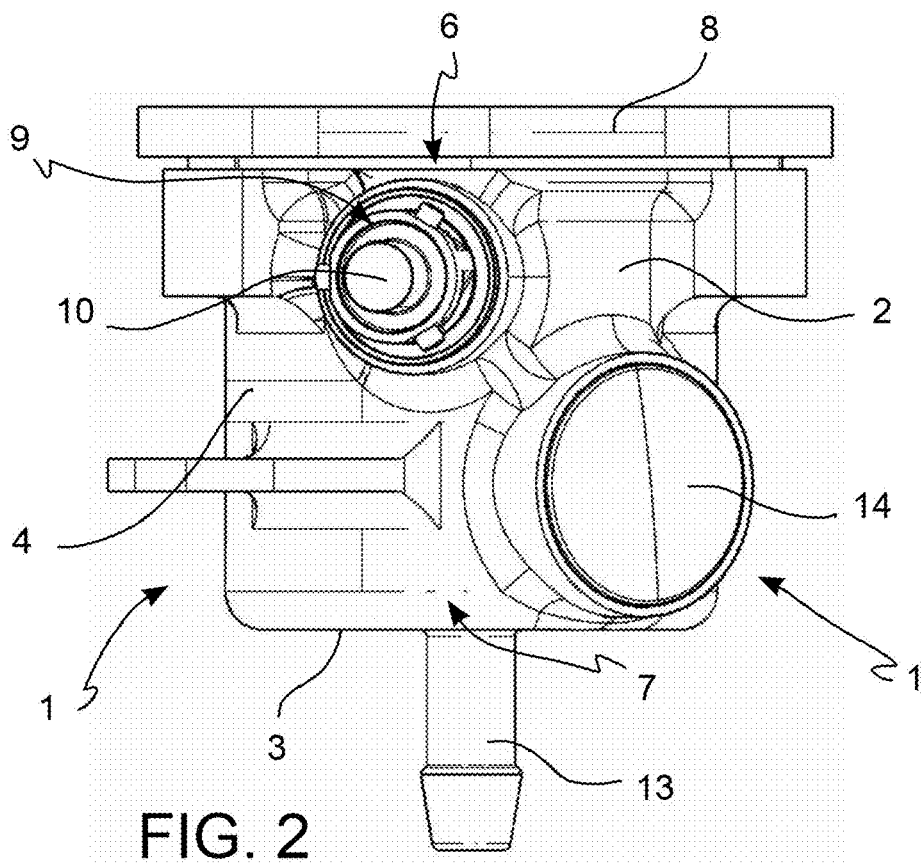
FIG. 2 is a side view of the brake fluid reservoir shown in FIG. 1.
Figure 3:
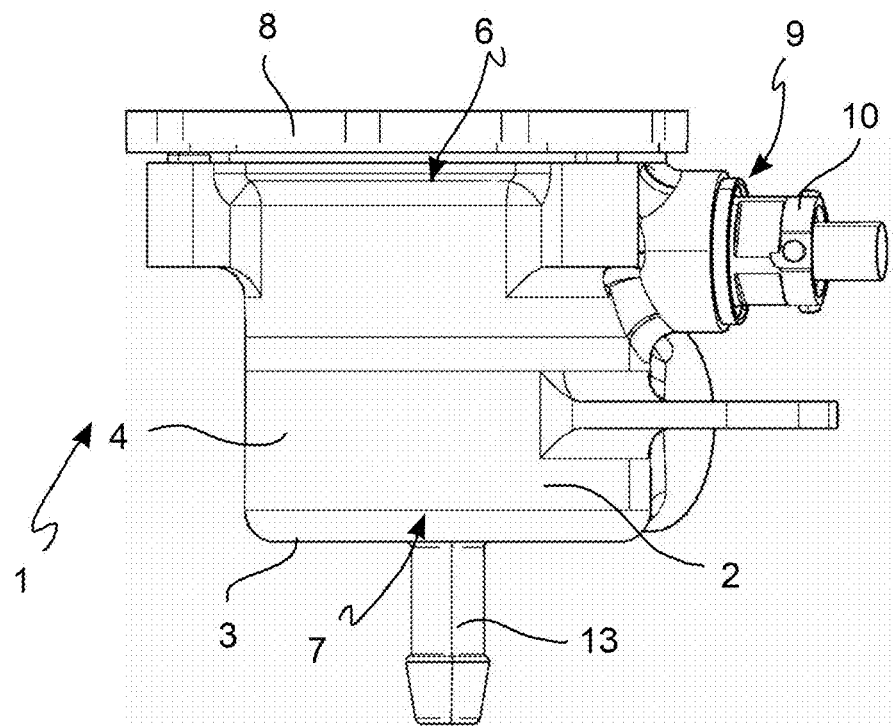
FIG. 3 is a further side view of the brake fluid reservoir shown in FIG. 1.
Figure 4:
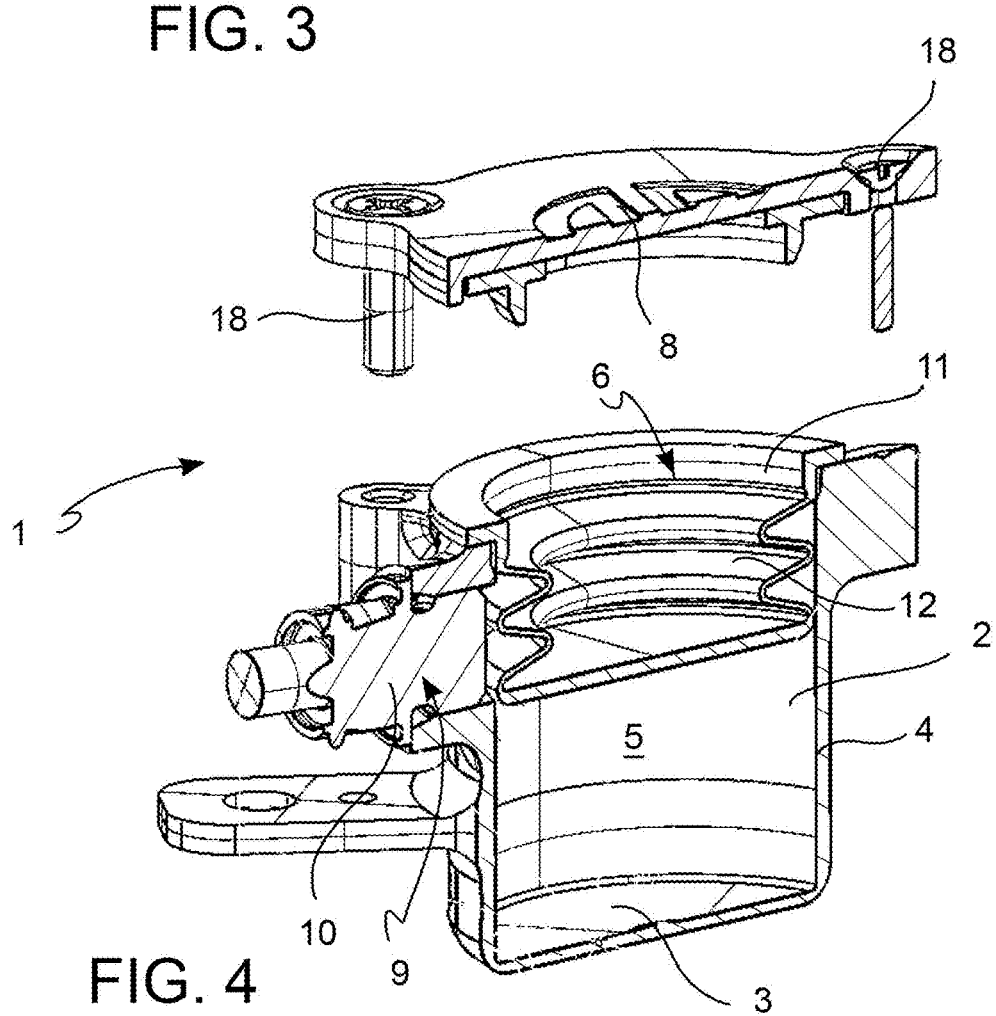
FIG. 4 is a longitudinal section view of a partially disassembled brake fluid reservoir, according to an embodiment of the invention.
Figure 5:
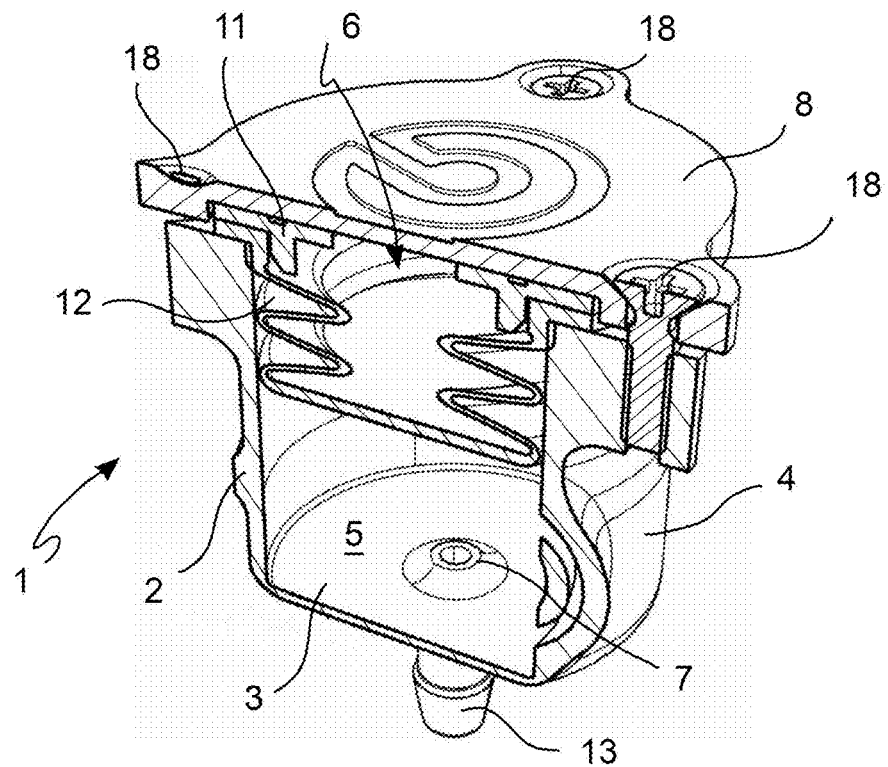
FIG. 5 is a longitudinal section perspective view of a brake fluid reservoir, according to an embodiment of the invention.
Figure 6:
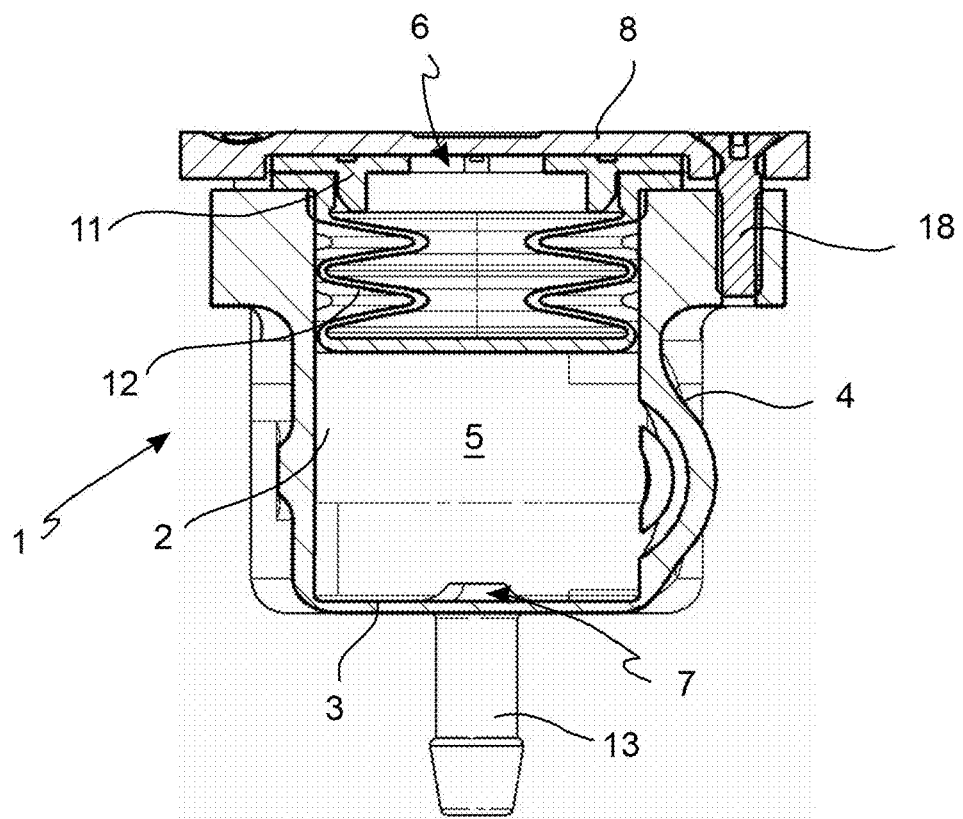
FIG. 6 is a longitudinal section side view of the brake fluid reservoir shown in FIG. 5.
Figure 7:
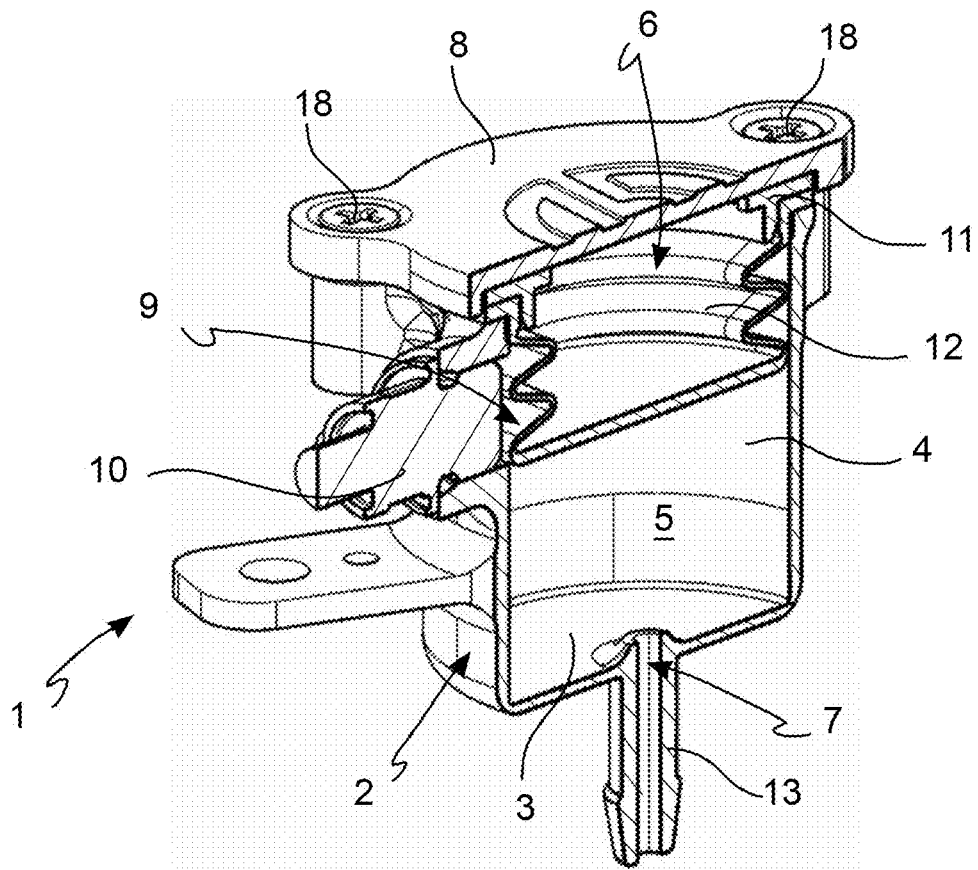
FIG. 7 is a further longitudinal section perspective view of the brake fluid reservoir shown in FIG. 5.
Figure 8:
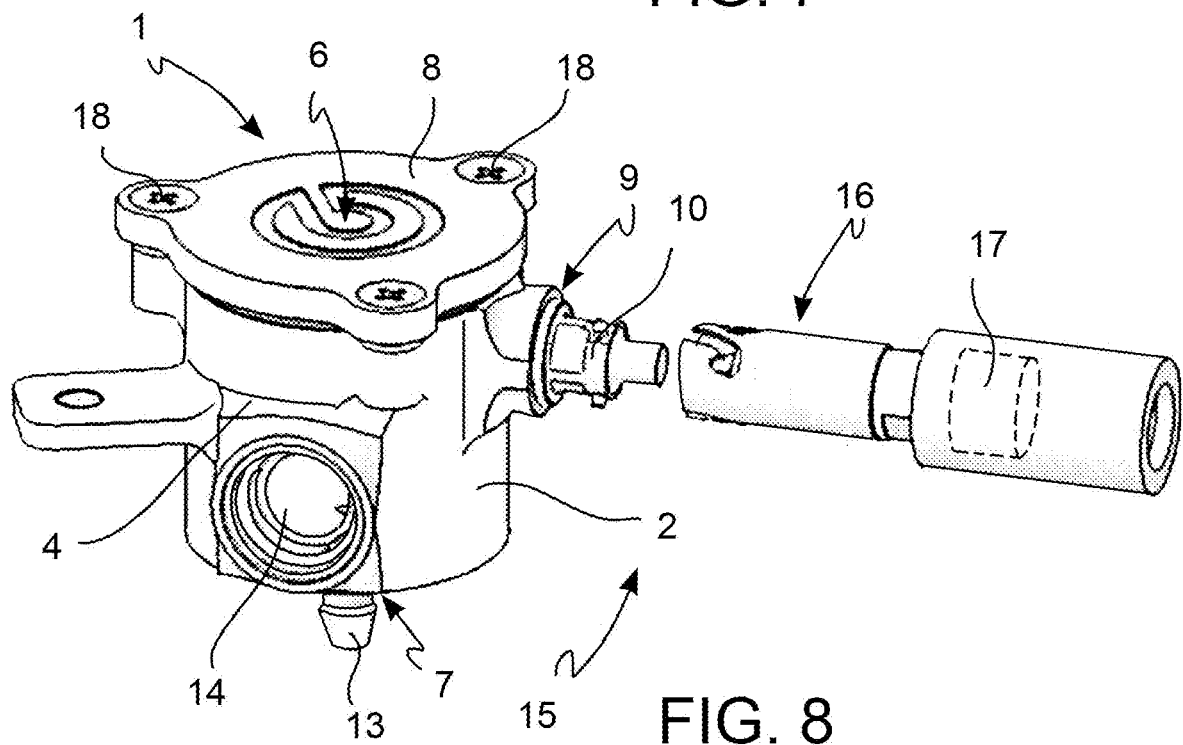
FIG. 8 is a perspective view of a brake fluid reservoir system, according to an embodiment of the invention.
Figure 9:
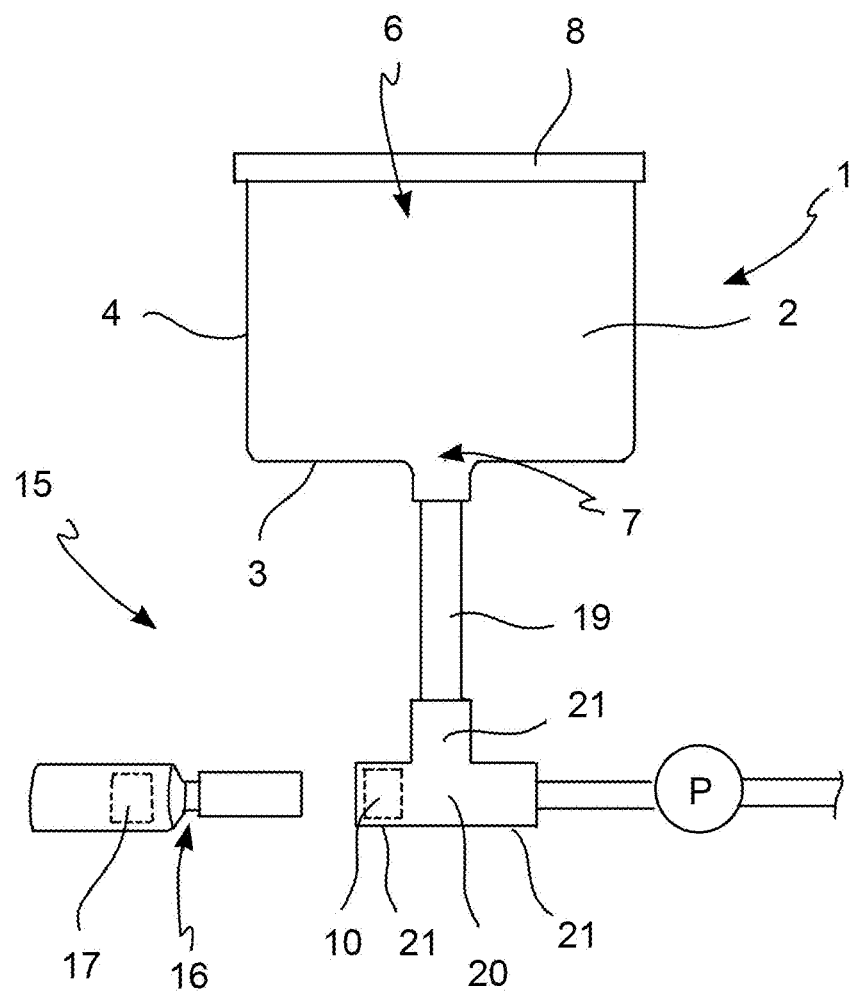
FIG. 9 is a diagrammatic view of a brake fluid reservoir according to a further embodiment of the invention.

With reference to the figures, a brake fluid reservoir is indicated by reference numeral 1.

The reservoir 1 comprises a receptacle 2 adapted to contain the brake fluid.

The receptacle 2 forms a bottom wall 3 and a perimetric wall 4.

The bottom wall 3 and the perimetric wall 4 define an inner compartment 5 for containing the brake fluid.

The perimetric wall 4 defines an inlet opening 6 opposite to the bottom wall 3.

The inlet opening 6 communicates with the inner compartment 5.

The bottom wall 3 defines an outlet opening 7 communicating with the inner compartment 5 and fluidically connectable to a pump of a braking system.

The reservoir 1 further comprises a cap 8 configured to close the inlet opening 6.

According to an aspect of the invention, the receptacle 2 defines an auxiliary opening 9.

The auxiliary opening 9 is distinct from the inlet opening 6 and the outlet opening 7.

The auxiliary opening 9 communicates with the inner compartment 5.

Moreover, the reservoir 1 comprises a valve 10 positioned in the auxiliary opening 9.

The valve 10 is configured to regulate a flow of brake fluid through the auxiliary opening 9.

Advantageously, a reservoir 1 thus configured allows loading the brake fluid through the valve 10 positioned in the auxiliary opening 9. Furthermore, during the loading of the brake fluid, the inlet opening 6 of the reservoir 1 remains closed. Therefore, the contamination of the brake fluid by external agents is minimized because the flow of brake fluid entering in the reservoir 1 is regulated by the valve 10 and thus is no longer exposed to the external environment because the inlet opening 6 remains closed.

With further advantage, the bleeding operations can also be performed by means of the auxiliary opening 9, therefore the contamination of the brake fluid is also minimized during these operations.

With further advantage, the receptacle 2 does not require oversizing to facilitate the brake fluid loading, as required instead by the reservoirs of the prior art. Therefore, the reservoir 1 thus configured has smaller dimensions than the reservoirs of the prior art and can be sized to contain only the amount of brake fluid needed to compensate for the wear of the friction materials of the braking system.

With further advantage, the small sizing of the reservoir 1 allows detecting the consumption of the brake fluid contained in the reservoir 1 in an easier manner, by the braking system, and thus allows detecting any excessive wear of the braking system.

According to an embodiment, the valve 10 is a proportional valve, or a quick-connect valve, or a Staubli type valve.

Advantageously, this type of valve 10 facilitates the brake fluid loading and bleeding operations.

According to an embodiment, the auxiliary opening 9 is defined on the perimetric wall 4.

According to an embodiment, the auxiliary opening 9 extends in a direction substantially transverse to the perimetric wall 4.

Advantageously, such a positioning of the auxiliary opening 9 facilitates the brake fluid loading and bleeding operations.

According to an embodiment, the perimetric wall 4 is substantially cylindrical in shape. According to a preferred embodiment, the bottom wall 3 is substantially planar in shape.

According to an embodiment, the cap 8 is connected to the perimetric wall 4 by removable fastening means.

Advantageously, the cap 8 prevents external agents from contaminating the brake fluid through the inlet opening 6 while loading the brake fluid through the auxiliary opening 9, or during the steps of bleeding the brake fluid through the auxiliary opening 9.

Preferably, the cap 8 is connectable to the perimetric wall 4, so as to close the inlet opening 6, by threaded connecting means 18.

According to an embodiment, the cap 8 is connected to the perimetric wall 4 by means of a plurality of screws 18, e.g., by 3 screws arranged peripherally equally spaced apart on the cap 8.

According to an embodiment, the reservoir 1 comprises a membrane 11 and/or a diaphragm 12.

The membrane 11 and the diaphragm 12 are positioned in the inner compartment 5 of the receptacle 2, under the cap 8.

The membrane 11 and the diaphragm 12 are configured to form a fluid-tight seal at the cap 8 and prevent dispersions of the brake fluid contained within the inner compartment 5 of the reservoir 1 through the inlet opening 6.

Advantageously, when the membrane 11 or the diaphragm 12 needs to be replaced, it can be extracted from the reservoir 1 through the inlet opening 6. This replacement operation, comprising the opening of the cap 8, can be advantageously performed in a controlled environment to avoid the contamination of the reservoir 1.

According to an embodiment, the valve 10 is positioned under the membrane 11.

Specifically, the auxiliary opening 9 in which the valve 10 is positioned, is defined on the peripheral wall 4, between the membrane 11 and bottom wall 3.

Advantageously, such a configuration facilitates the brake fluid loading and bleeding.

According to an embodiment, the reservoir 1 comprises an outlet conduit 13 extending from the outlet opening 5 to the outside of the reservoir 1.

The outlet conduit 13 is in fluid communication with the inner compartment 5.

The outlet conduit 13 is configured to be directly or indirectly connectable to a braking system pump to convey the brake fluid contained in the reservoir 1 towards the pump of the braking system.

According to a preferred embodiment, the outlet conduit 13 extends in a transverse direction with respect to the bottom wall 3.

According to an embodiment, the outlet device 13 comprises snapping connection means.

Advantageously, the snapping connection means allow achieving a quick coupling of the outlet conduit 13 to the pump of a braking system.

According to an embodiment, the receptacle 2 is made of a polymer material. Alternatively, the receptacle 2 is made of a metal material, preferably aluminum.

According to an embodiment, the receptacle 2 comprises a porthole 14 positioned on the perimetric wall 4.

Advantageously, the porthole 14 allows checking the level of brake fluid inside the receptacle 2.

According to a further aspect of the invention, the brake fluid reservoir system 15 comprises at least one reservoir 1 as previously described.

Moreover, the system 15 comprises a delivery conduit 16.

The delivery conduit 16 is configured to be fluidically connectable to the valve 10 of the reservoir 1 so as to convey the brake fluid into the reservoir 1 through the valve 10 positioned in the auxiliary opening 9.

According to an embodiment, the delivery conduit 16 comprises a filter 17.

The filter 17 is configured to filter the brake fluid entering in the reservoir 1.

Advantageously, the contamination of the brake fluid entering in the reservoir 1 is minimized by the filter 17.

With further advantage, since the filter 17 is positioned inside the delivery conduit 16, and thus outside the reservoir 1 and disconnectable from the reservoir 1, the filter 17 does not interfere with the bleeding operations and does not hinder the leakage of air from the system 15. Indeed, during the bleeding operations, the delivery conduit 16 is disconnected from the valve 10, through which the brake fluid is bled, therefore the filter does not interfere with the bleeding operation.

With further advantage, by means of the delivery conduit 16, the filtered brake fluid is introduced into the reservoir 1 without exposing the brake fluid to the external environment, thus minimizing the contamination thereof by external agents.

ALTERNATIVE EMBODIMENT

According to an alternative embodiment, a brake fluid reservoir 1 comprises a receptacle 2 adapted to contain the brake fluid.

The receptacle 2 forms a bottom wall 3 and a perimetric wall 4.

The bottom wall 3 and the perimetric wall 4 define an inner compartment 5 for containing the brake fluid.

The perimetric wall 4 defines an inlet opening 6 opposite to the bottom wall 3 and communicating with the inner compartment 5.

The bottom wall 3 defines an outlet opening 7 communicating with the inner compartment 5 and fluidically connectable to a pump of a braking system.

The reservoir 1 further comprises a cap 8 configured to close the inlet opening 6.

The reservoir 1 further comprises a pump inlet conduit 19 fluidically connected to the outlet opening 7 and extending in the opposite direction with respect to the inner compartment 5.

According to an aspect of the invention, the reservoir 1 comprises a three-way component 20 comprising three channels 21 fluidically connected to one another.

One of the three channels 21 of the three-way component 20 is connected to the pump inlet conduit 19.

A second one of the three channels 21 of the three-way component 20 is connectable to the pump of the braking system.

A third one of the three channels 21 comprises a valve 10 therein.

The valve 10 is configured to regulate a flow of brake fluid through said third one of the three channels 21.

Advantageously, a reservoir thus configured allows bleeding and loading the brake fluid through the valve 10 located in the three-way component 20, without exposing the brake fluid to the external environment and thus avoiding the contamination thereof. Indeed, when bleeding and loading the brake fluid inside the reservoir, the inlet opening remains closed.

With further advantage, the receptacle 2 does not require oversizing to facilitate the brake fluid loading, as required instead by the reservoirs of the prior art. Therefore, the reservoir 1 thus configured has smaller dimensions than the reservoirs of the prior art and can be sized to contain only the amount of brake fluid needed to compensate for the wear of the friction materials of the braking system.

According to an embodiment, the valve 10 is a proportional valve, or a quick-connect valve, or a Staubli type valve.

According to an embodiment, the cap 8 is connected to the perimetric wall 4 by means of removable fastening means, preferably by means of threaded connection means 18.

According to an embodiment, the reservoir 1 comprises a membrane 11 and a diaphragm 12, where the membrane 11 and the diaphragm 12 are positioned in the inner compartment 5 of the receptacle 2, under the cap 8, and where the membrane 11 and the diaphragm 12 are configured to form a tight seal at the cap 8 and prevent leakages of the brake fluid contained inside the inner compartment 5 of the reservoir 1 through the inlet opening 6.

According to an embodiment, the receptacle 2 is made of polymer material or is made of metal material, preferably aluminum.

According to an embodiment, the receptacle 2 comprises a porthole 14 positioned on the perimetric wall 4, configured to check the level of the brake fluid inside the receptacle 2.

According to a further aspect of the invention, a brake fluid reservoir 15 system comprises a reservoir 1 as previously described and a delivery conduit 16.

The delivery conduit 16 is configured to be fluidically connectable to the valve 10 in the reservoir 1 so that the brake fluid is conveyed into reservoir 1 by means of the valve 10 located in the three-way component 20.

According to an embodiment, the delivery conduit 16 comprises a filter 17, where the filter 17 is configured to filter the brake fluid entering in the reservoir 1.

Advantageously, the contamination of the brake fluid entering in the reservoir 1 is minimized by the filter 17.

With further advantage, since the filter 17 is positioned inside the delivery conduit 16, and thus outside the reservoir 1 and disconnectable from the reservoir 1, the filter 17 does not interfere with the bleeding operations and does not hinder the leakage of air from the system 15. Indeed, during the bleeding operations, the delivery conduit 16 is disconnected from the valve 10, through which the brake fluid is bled, therefore the filter does not interfere with the bleeding operation.

With further advantage, by means of the delivery conduit 16, the filtered brake fluid is introduced into the reservoir 1 without exposing the brake fluid to the external environment, thus minimizing the contamination thereof by external agents.

Obviously, those skilled in the art will be able to make changes or adaptations to the present invention, without however departing from the scope of the following claims.

LIST OF REFERENCE NUMERALS

1. Reservoir
2. Receptacle
3. Bottom wall
4. Perimetric wall
5. Inner compartment
6. Inlet opening
7. Outlet opening
8. Cap
9. Auxiliary opening
10. Valve
11. Membrane
12. Diaphragm
13. Outlet conduit
14. Porthole
15. Reservoir system
16. Delivery conduit
17. Filter
18. Threaded connection means
19. Pump inlet conduit
20. Three-way component
21. Channels

The invention claimed is:

1. A brake fluid reservoir comprising:
a receptacle, adapted to containing brake fluid, said receptacle forming a bottom wall and a perimetric wall, wherein the bottom wall and the perimetric wall define an inner compartment for containing the braking fluid, wherein the perimetric wall defines an inlet opening opposite to the bottom wall and communicating with the inner compartment, and the bottom wall defines an outlet opening communicating with the inner compartment and fluidically connectable with a braking system;
a cap configured to close the inlet opening; charactertized in that the receptacle defines an auxiliary opening, distinct from the inlet opening and the outlet opening, and communicating with the inner compartment; and wherein the reservoir comprises a valve positioned in the auxiliary opening, said valve being configured to regulate a flow of brake fluid through the auxiliary opening,
wherein the valve is a proportioning valve.

2. A reservoir according to claim 1, wherein the auxiliary opening is defined on the perimetric wall.

3. A reservoir according to claim 1, wherein the cap is connected to the perimetric wall by threaded connection means.

4. A reservoir according to claim 1, comprising a membrane and a diaphragm, wherein the membrane and the diaphragm are positioned in the inner compartment of the receptacle, below the cap, and wherein the membrane and diaphragm are configured to achieve a fluid-tight seal at the cap and prevent leakage of the brake fluid contained within the inner compartment of the reservoir through the inlet opening.

5. A reservoir according to claim 4, wherein the auxiliary opening is defined on the perimetric wall, between the membrane and the bottom wall.

6. A reservoir according to claim 1, comprising an outlet conduit extending outwards from the outlet opening of the reservoir, said outlet conduit being in fluid communication with the inner compartment, wherein the outlet conduit is configured to be either directly or indirectly connectable to a pump of a braking system, for conveying the brake fluid contained in the reservoir to the pump of the braking system, and wherein the outlet conduit extends in a transverse direction to the bottom wall,
and/or wherein the receptacle is formed of polymeric material or is formed of metallic material, preferably aluminum, and/or wherein the receptacle comprises a porthole positioned on the perimetric wall, configured to check the brake fluid level in the receptacle.

7. A brake fluid reservoir system, comprising a reservoir according to claim 1, and a delivery conduit, wherein the delivery conduit is configured to be fluidically connectable to the valve of the reservoir to convey the brake fluid into the reservoir through the valve located in the auxiliary opening.

8. A system according to claim 7, wherein the delivery conduit comprises a filter, wherein the filter is configured to filter the brake fluid entering the reservoir.

* * * * *